United States Patent [19]

Hansen

[11] Patent Number: 5,687,994
[45] Date of Patent: Nov. 18, 1997

[54] PIPE COUPLING

[76] Inventor: Albert Frederick Hansen, 156 Lower Dent Street, Whangarei, New Zealand

[21] Appl. No.: 502,872

[22] Filed: Jul. 14, 1995

[51] Int. Cl.$^6$ ................................................. F16L 25/00
[52] U.S. Cl. .................. 285/12; 285/40; 285/177; 285/251
[58] Field of Search .................. 285/251, 40, 246, 285/247, 12, 177

[56] References Cited

U.S. PATENT DOCUMENTS

| | | | |
|---|---|---|---|
| 2,059,040 | 10/1936 | Scholtes | 285/251 |
| 2,448,747 | 9/1948 | Swain | 285/251 X |
| 4,079,966 | 3/1978 | Berry et al. | 285/40 X |
| 4,124,234 | 11/1978 | Clark . | |
| 5,165,727 | 11/1992 | Valley | 285/12 |
| 5,240,291 | 8/1993 | Zornow | 285/251 X |
| 5,335,943 | 8/1994 | Duryea | 285/177 X |
| 5,375,887 | 12/1994 | Johnson | 285/12 |

FOREIGN PATENT DOCUMENTS

| | | |
|---|---|---|
| 1425447 | 12/1965 | France . |
| 1434683 | 2/1966 | France . |
| 2093360 | 1/1972 | France ................... 285/251 |
| 2659269 | 7/1978 | Germany ................. 285/40 |
| 139631 | 1/1980 | Germany ................. 285/40 |
| 3616964 | 11/1987 | Germany ................. 285/251 |

*Primary Examiner*—Dave W. Arola
*Attorney, Agent, or Firm*—Dorsey & Whitney LLP

[57] ABSTRACT

A pipe coupling has a body having a hollow interior including a tubular tail onto which the end of a pipe can be engaged. A coupling nut is captively mounted about the body of the coupling and has a screw threaded interior. When the end of a pipe has been pushed sufficiently onto the tubular tail, rotation of the coupling nut will threadedly engage the nut onto the exterior of the pipe end and draw the pipe further onto the tubular tail of the coupling. The tubular tail of the coupling may be formed as a separate replacable component from the balance of the body of the coupling such that the tail can be removed and substituted by a replacement tail of larger or smaller outside diameter to accomodate larger or smaller pipes.

9 Claims, 3 Drawing Sheets

1

PIPE COUPLING

FIELD OF INVENTION

The invention comprises a pipe coupling.

BACKGROUND ART

Various forms of couplings for pipes formed of plastics materials are known. The present invention provides an improved or at least alternative form of pipe coupling.

SUMMARY OF INVENTION

In broad terms the invention comprises a pipe coupling comprising a body having a hollow interior for fluid flow through the coupling including a tubular part or tail onto which the end of a pipe can be engaged, a coupling nut captively mounted about the body of the coupling and having a screw threaded interior, such that when the end of a pipe has been pushed sufficiently onto the tubular tail, rotation of the coupling nut will threadedly engage the nut onto the exterior of the pipe end and draw the pipe further onto the tubular tail of the coupling.

In one form of the coupling of the invention the tubular tail of the coupling is formed as a separate, replacable component from the balance of the body of the coupling and is fitted to the other part of the body of the coupling, for example by screwing together. This enables tubular tails of different external diameters to be interchanged to accommodate pipes having significantly different internal diameters. In use one tail can be unscrewed and a replacement tail of larger or smaller diameter can then be screwed into position to enable the coupling to be used with pipes of varying inside diameters and wall thicknesses.

Pipe couplings of the invention may be formed as "straight" couplings which are used to couple two pipe ends together in line. Alternatively pipe couplings of the invention may be formed as "elbows" i.e. right angles or similar, T's i.e. a coupling for connecting three pipe ends together, or as a coupling to connect a pipe end to a piece of equipment such as a pump or similar.

DESCRIPTION OF DRAWINGS

The invention will be further described with reference to the accompanying drawings which show preferred form couplings of the invention which are "straight" couplings for coupling two pipe ends together in line, by way of example. In the drawings.

DETAILED DESCRIPTION OF PREFERRED DRAWINGS

Figure 1:
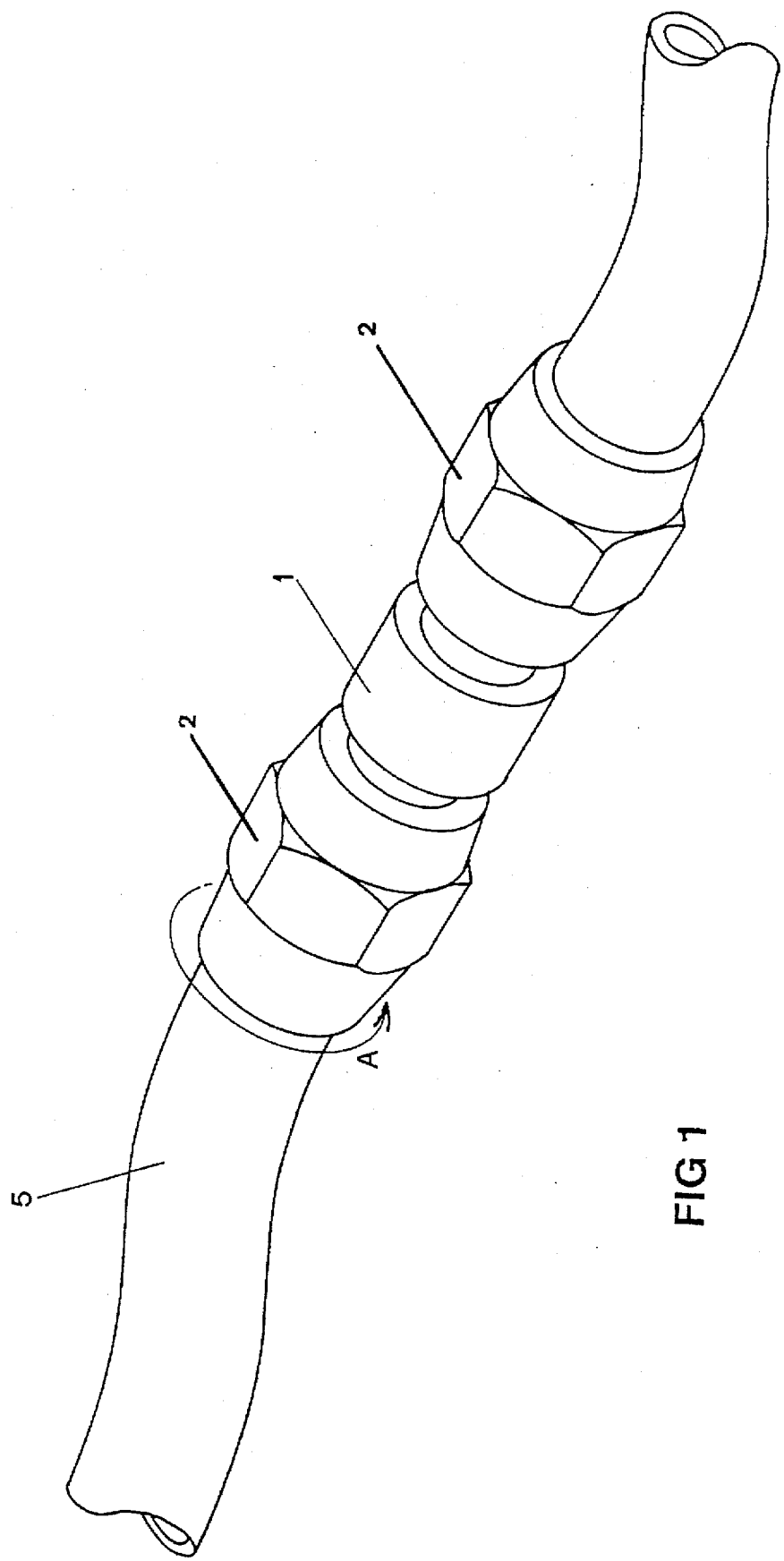
FIG. 1 shows one preferred form coupling with a length of pipe connected to each side of the coupling.

The preferred form couplings comprise a body 1 having a hollow interior and on each side a coupling nut 2 and a tubular portion or tail 4 which engages into the end of a length of pipe 5 in use as shown. The tail 4 on each side is preferably tapered with a reducing diameter towards the end of the tail and is preferably formed with annular "barbs" 6. These barbs 6 will engage into the inside wall of a pipe end to assist in holding the pipe securely on the coupling.

Each coupling nut 2 has a threaded interior 7 as shown. The threaded interior of the coupling nut may be slightly tapered toward the end 2a of the coupling nut.

Figure 2:
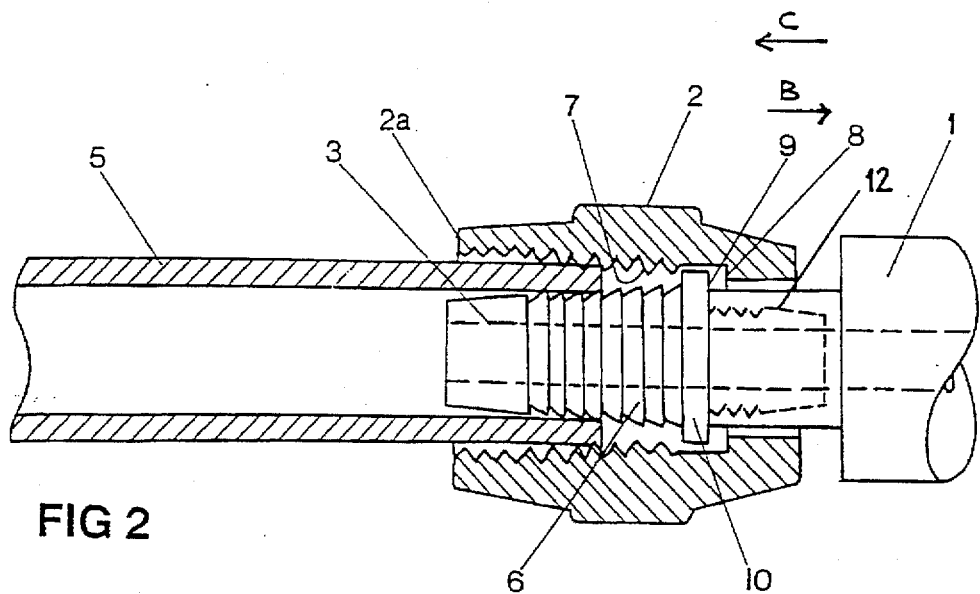
FIG. 2 shows one side of the preferred form coupling of FIG. 1 in cross-section, showing the end of a length of pipe pushed partly onto the tail of the coupling but before rotation of the coupling nut to draw the pipe fully home.
Figure 3:
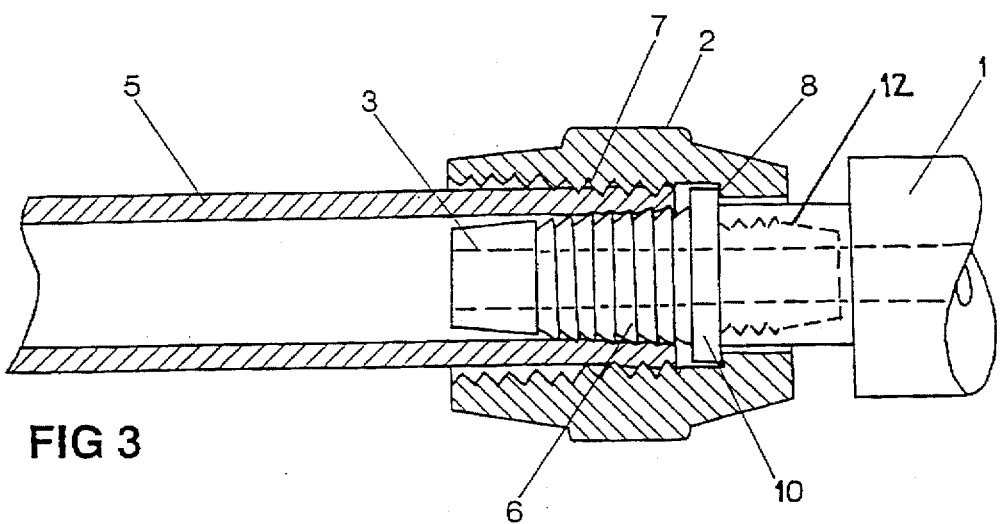
FIG. 3 shows one side of the coupling of FIGS. 1 and 2 again in cross-section but after rotation of the coupling nut to draw the pipe end onto the tail of the coupling.

The coupling nuts 2 are held captive on the body 1 of the coupling one on each side. In the coupling of FIGS. 1 to 3, shown in cross-section in FIGS. 2 and 3, an internal annular wall 8 at one end of the coupling nut engages behind raised annular part 10 as shown in FIGS. 2 and 3. On each side the coupling nut can be rotated about the body part of the coupling as indicated by arrow A in FIG. 1 on one side, but the coupling nut cannot move past the pan 10 i.e. the coupling nuts cannot normally be removed from the body of the coupling. The coupling nut may have a hexagonal exterior 2b so that in use it can be turned with a spanner if necessary. Preferably there is sufficient space behind the annular wall 10 which holds the coupling nut on the body of the coupling on each side, to allow the nut some back and forward movement along the body of the coupling as indicated by arrows B and C in FIG. 2.

In use of the coupling to connect a pipe end to the coupling, the coupling nut is drawn back against the body 1 of the coupling and the pipe end is pushed as far as possible on to the tail 4 of the coupling on one side. The coupling nut is then pushed forward on the body of the coupling in the direction of arrow C to initially contact the pipe end 5 as shown in FIG. 2 and rotated, so that the nut 2 threads onto the exterior of the pipe end 5. As the coupling nut 2 is rotated, because it is captively mounted on the body of the coupling behind the annular wall 10 it will draw the pipe end 5 further on to the tail 4 of the coupling, to the position shown in FIG. 3, to form a strong mechanical connection between the pipe and the coupling. Preferably the threads 7 of the coupling nut are formed with a shark tooth or buttress thread to further prevent the pipe from being pulled off the end of the coupling.

In the preferred form coupling shown in FIGS. 2 and 3 the tail 4 on each side including the part of the tail with the barbs 6 and up to and including the annular wall 10 is formed as separate component which is threaded into the other part of the body 1 on each side as indicated at 12 in FIGS. 2 and 3. The reducing diameter taper of the tail 4 on each side enables differences in pipe diameter to be accommodated, but also the tails 4 can be removed from the body 1 of the coupling by unscrewing and then be replaced. This enables any one tail 4 to be removed and replaced with another tail 4 of a different outside diameter, to accommodate pipes having significantly different internal diameters. Alternatively the replacable tail 4 may be a snap fit into or onto the body of the coupling, for example.

Figure 4:
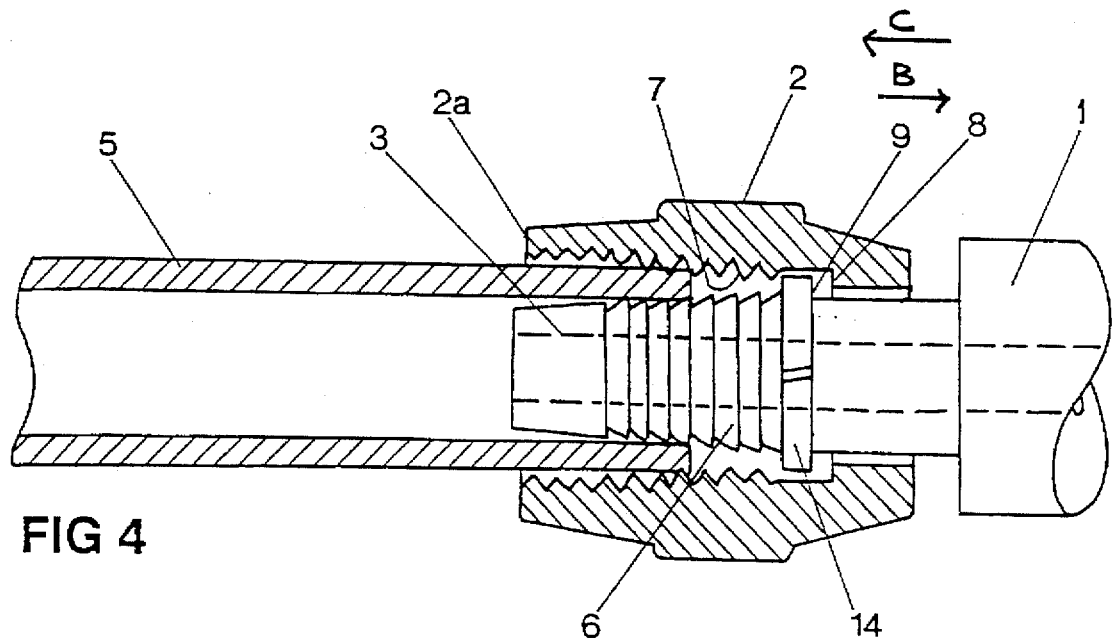
FIG. 4 shows one side of another preferred form coupling similar to that of FIGS. 1 to 3, in cross-section similar to FIG. 2.
Figure 5:
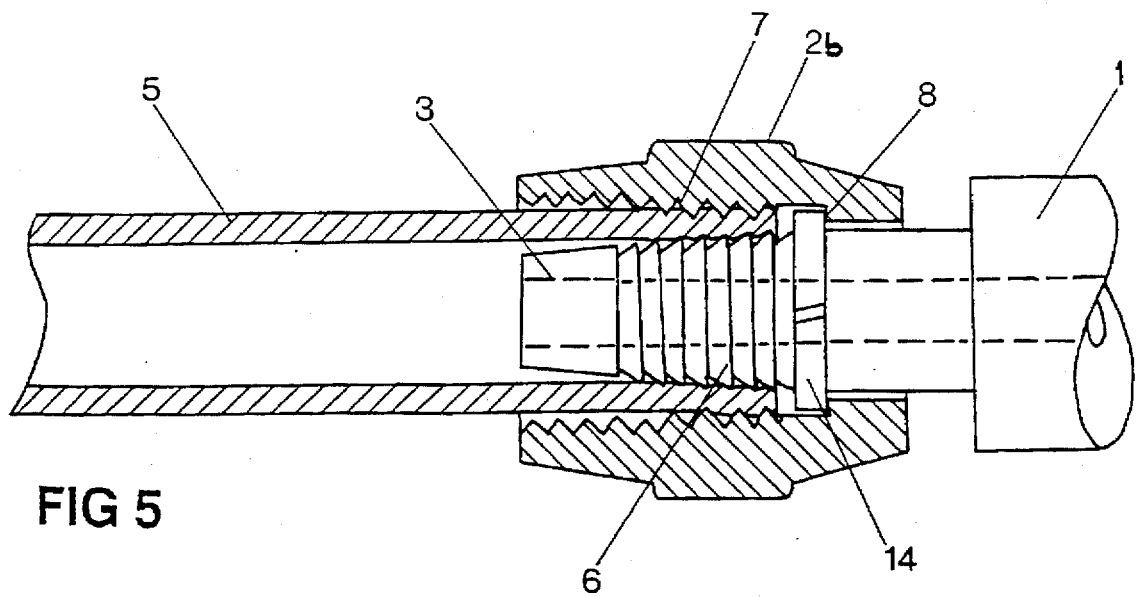
FIG. 5 shows one side of the coupling of FIG. 4 in cross-section similar to FIG. 3.

FIGS. 4 and 5 show another preferred form of coupling which is very similar to that of FIGS. 2 and 3 except that the tail 4 is not screw threaded to the body of the coupling on each side but rather is integrally formed. Also, the annular wall 10 is replaced by a circlip 14—see FIGS. 4 and 5. The circlip which may be a plastic circlip for example, is pushed into the interior of the coupling nut 2 over the tail of the coupling after the nut has been put in position on the body of the coupling. In assembly of the coupling of FIGS. 1 to 3 by comparison, the coupling nut is first placed in position on the body of the coupling excluding the tail, and the tail incorporating the integral annual part 10 is then screwed into place to capture the coupling nut on the coupling.

Figure 6:
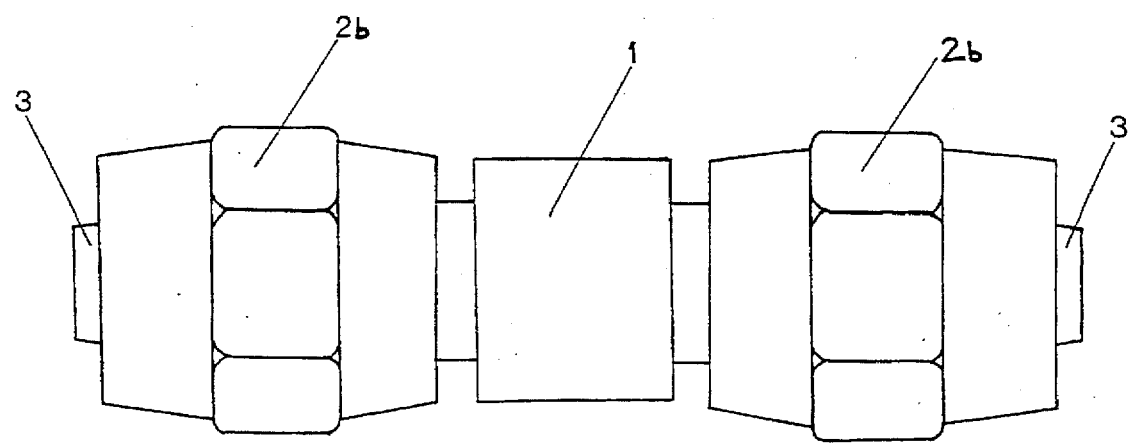
FIG. 6 shows the coupling of FIGS. 1 to 3, and 4 and 5, in side view.

As stated the preferred form coupling shown in FIGS. 1 to 3 is a "straight coupling" for coupling two pipe ends together in line as shown. The design of the coupling shown in FIGS. 2 and 3 is the same on each side as shown in FIGS. 1 and 6. The coupling may also be formed in other configurations such as an "elbow" coupling similar to the straight coupling shown but with a bend of any desired angle or as a T coupling for coupling three pipe ends together for example.

The forgoing describes the invention including a preferred form thereof. Alterations and modifications as will be obvious to those skilled in the art are intended to be incorporated within the scope hereof, as defined in the following claims.

I claim:

1. A pipe coupling comprising a body having a hollow interior for fluid flow through the coupling including a tubular tail onto which the end of a pipe can be engaged, a coupling nut captively mounted about the body of the coupling with sliding movement along the body of the coupling and having a screw threaded interior, said tubular tail extending at least partially through the interior of the coupling nut, such that when the end of a pipe has been pushed partly onto the tubular tail the coupling nut may be moved along the body of the coupling towards the tubular tail to threadedly engage the nut onto the exterior of the pipe end, and the coupling nut may be rotated to draw the pipe further onto the tubular tail of the coupling and clamp the pipe end between the threaded interior of the coupling nut and the exterior of the tubular tail of the coupling extending within the pipe end.

2. A coupling according to claim 1, wherein the tubular tail of the coupling is formed as a separate replacable component from the balance of the body of the coupling such that the tail can be removed and substituted by a replacement tail of larger or smaller outside diameter.

3. A coupling according to claim 2 together with at least one additional, replacement tail of different diameter.

4. A coupling according to claim 2, wherein the tail is threadedly connected to the body of the coupling.

5. A coupling according to claim 2, wherein the tail of the coupling comprises a series of annular barbs around the tail of the coupling to engage into the inside wall of a pipe end.

6. A coupling according to claim 2, wherein the coupling nut is held captive on the body of the coupling by an enlarged diameter part of the replaceable tail.

7. A coupling according to claim 2, wherein the coupling nut has limited sliding movement longitudinally along the body of the coupling.

8. A coupling according to claim 1, wherein the threads of the screw threaded interior of the coupling nut are of a shark tooth or buttress form.

9. A coupling according to claim 1, wherein the tail is tapered with an outside diameter which reduces towards the outer end of the tail.

* * * * *